United States Patent [19]

Kurihara et al.

[11] Patent Number: 5,088,350
[45] Date of Patent: Feb. 18, 1992

[54] AUTOMATIC TRANSMISSION SYSTEM FOR AN ALCOHOL ENGINE

[75] Inventors: Masaru Kurihara; Yoichi Saito, both of Tokyo, Japan

[73] Assignee: Fuji Jukogyo Kabushiki Kaisha, Tokyo, Japan

[21] Appl. No.: 643,569

[22] Filed: Jan. 18, 1991

[30] Foreign Application Priority Data

Jan. 24, 1990 [JP] Japan .................................. 2-15418

[51] Int. Cl.$^5$ .............................................. B60K 41/06
[52] U.S. Cl. ........................................ 74/861; 74/866
[58] Field of Search ................. 74/856, 857, 861, 865, 74/866; 364/424.1

[56] References Cited

U.S. PATENT DOCUMENTS 4,677,878 7/1987 Yamamori et al. ................... 74/861
4,843,916 7/1989 Bouta ............................... 74/861 X

FOREIGN PATENT DOCUMENTS

2625770 12/1977 Fed. Rep. of Germany ........ 74/861
63-115957 5/1988 Japan .

*Primary Examiner*—Dwight Diehl
*Attorney, Agent, or Firm*—Martin A. Farber

[57] ABSTRACT

An automatic transmission for an alcohol engine is upshifted in accordance with one of first and second shift patterns. The transmission is upshifted at a higher vehicle speed in accordance with the first shift pattern, and the transmission is upshifted at a lower vehicle speed by the second shift pattern. Concentration of the alcohol is detected by an alcohol concentration sensor. The second shift pattern is provided when the detected alcohol concentration is higher than a reference value.

5 Claims, 7 Drawing Sheets

SHIFT PATTERN (I) (LOW ALCOHOL CONCENTRATION)

FIG. 5b

SHIFT PATTERN (II) (HIGH ALCOHOL CONCENTRATION)

AUTOMATIC TRANSMISSION SYSTEM FOR AN ALCOHOL ENGINE

BACKGROUND OF THE INVENTION

The present invention relates to an automatic transmission system for a motor vehicle, and more particularly to an automatic transmission system for a motor vehicle driven by an alcohol engine using a mixed fuel of alcohol and gasoline, the transmission ratio of which is controlled in dependency on the concentration of the alcohol in the fuel.

In a conventional system for controlling an automatic transmission, a shift pattern of the transmission is formed in accordance with load on the engine or output torque and the load of the engine.

Japanese Patent Application Laid-open 63-115957 discloses a control system, the shift pattern of which is changed by a changeover switch provided on the engine for advancing or retarding the ignition timing in accordance with octane number of the fuel. The changeover switch is connected to shift pattern changing means. When fuel having a different octane number is used, the changeover switch is operated to advance or retard the ignition timing to select a shift pattern corresponding to the output power of the engine, thereby increasing the engine power and improving fuel consumption of the engine.

In the alcohol engine which is controlled to maximum efficiency, the calorific value of the alcohol is slightly larger than that of the gasoline in a theoretical air fuel ratio and the flaming speed of the alcohol is higher than the flaming speed of the gasoline. Consequently, as the concentration of alcohol in the fuel increases, the ignition timing of the engine approaches the top dead center so that thermal efficiency is increased, thereby increasing the engine power.

However, since the engine performance changes in accordance with the changing alcohol concentration, the driver feels uncomfortable.

SUMMARY OF THE INVENTION

An object of the present invention is to provide an automatic transmission system for an alcohol engine in which a preferable shift pattern is set in dependency on the concentration of alcohol, thereby improving driveability of a vehicle having the engine.

According to the present invention, there is provided an automatic transmission system for the vehicle driven by the alcohol engine using a mixed fuel of alcohol and gasoline, the system having a vehicle speed sensor for detecting speed of the vehicle and for producing a vehicle speed signal, a throttle position sensor for detecting opening degree of a throttle valve of the engine and for producing a throttle opening degree signal, range providing means responsive to the vehicle speed signal and the throttle opening degree signal for producing a change speed range signal representing one of change speed ranges of the automatic transmission and actuating means responsive to the change speed range signal for providing a change speed range, whereby the speed range of the automatic transmission shifts in accordance with a change speed shift pattern in the provided change speed range.

The system comprises the change speed shift pattern comprising such a plural shift pattern as a first shift pattern by which the transmission is upshifted at a higher vehicle speed and a second shift pattern by which the transmission is upshifted at a lower vehicle speed, an alcohol concentration sensor for sensing concentration of the alcohol in the fuel, comparator means for comparing the concentration of the alcohol sensed by the alcohol concentration sensor with a reference value, and change speed shift pattern determining means responsive to the comparison for determining current change shift pattern.

The range providing means is arranged to produce a change speed signal for upshifting in accordance with the determined change shift pattern.

Other objects and features of this invention will become understood from the following description with reference to the accompanying drawings.

DETAILED DESCRIPTION OF THE PREFERRED EMBODIMENT

Figure 1:
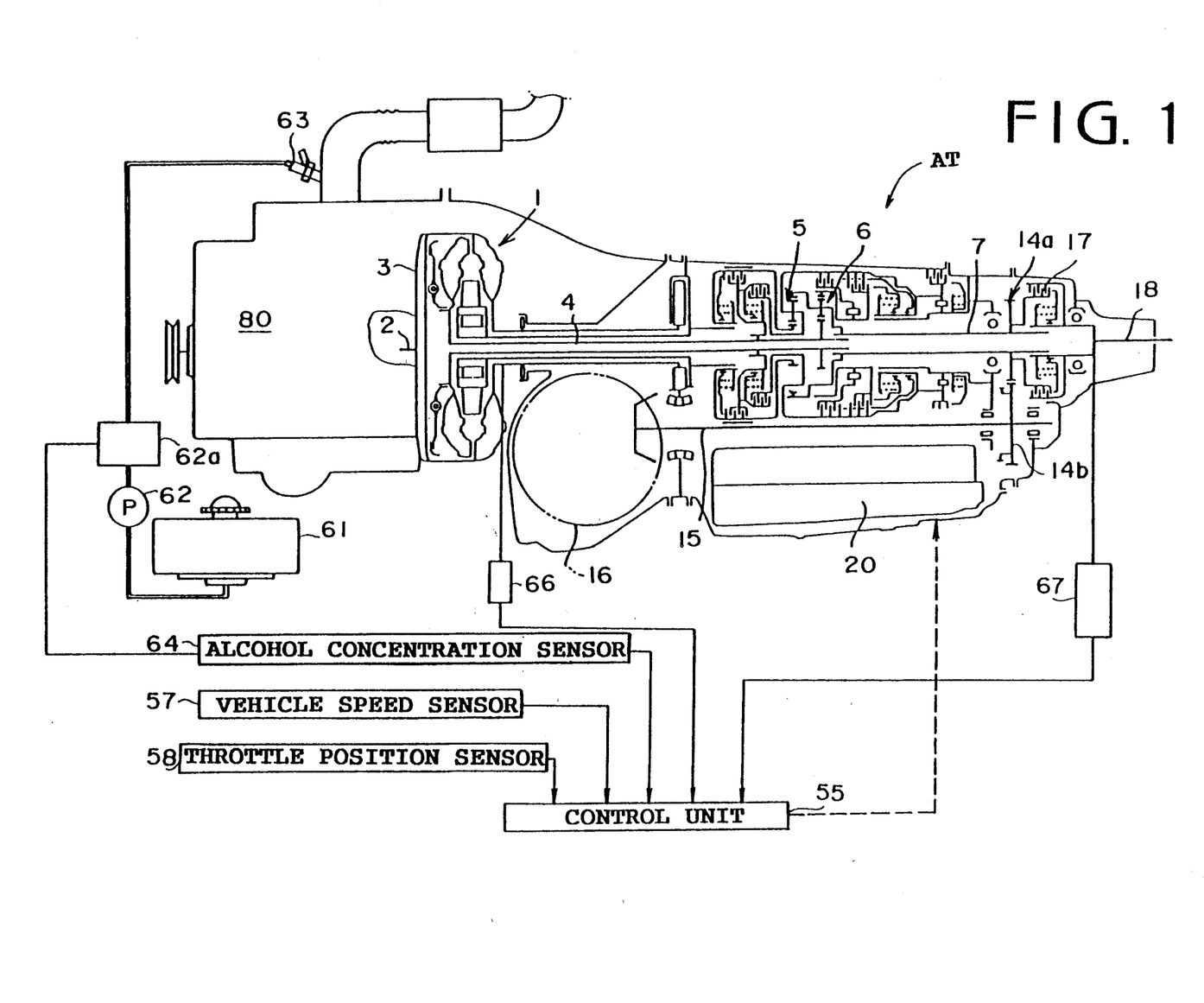
FIG. 1 is a schematic diagram showing a control system for an automatic transmission system according to the present invention.
Figure 2A:
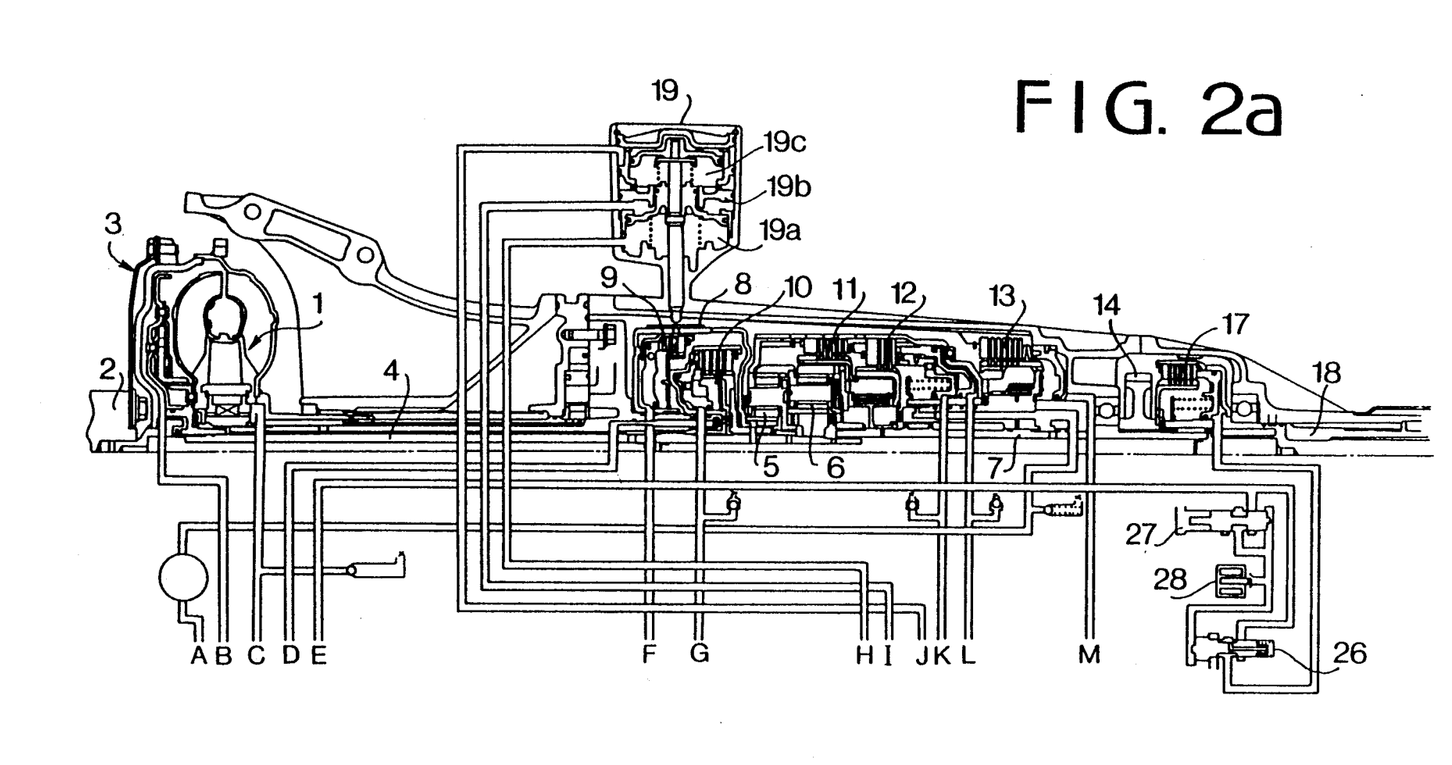
FIGS. 2a and 2b are schematic diagrams showing the automatic transmission system and a hydraulic control circuit thereof.
Figure 2B:
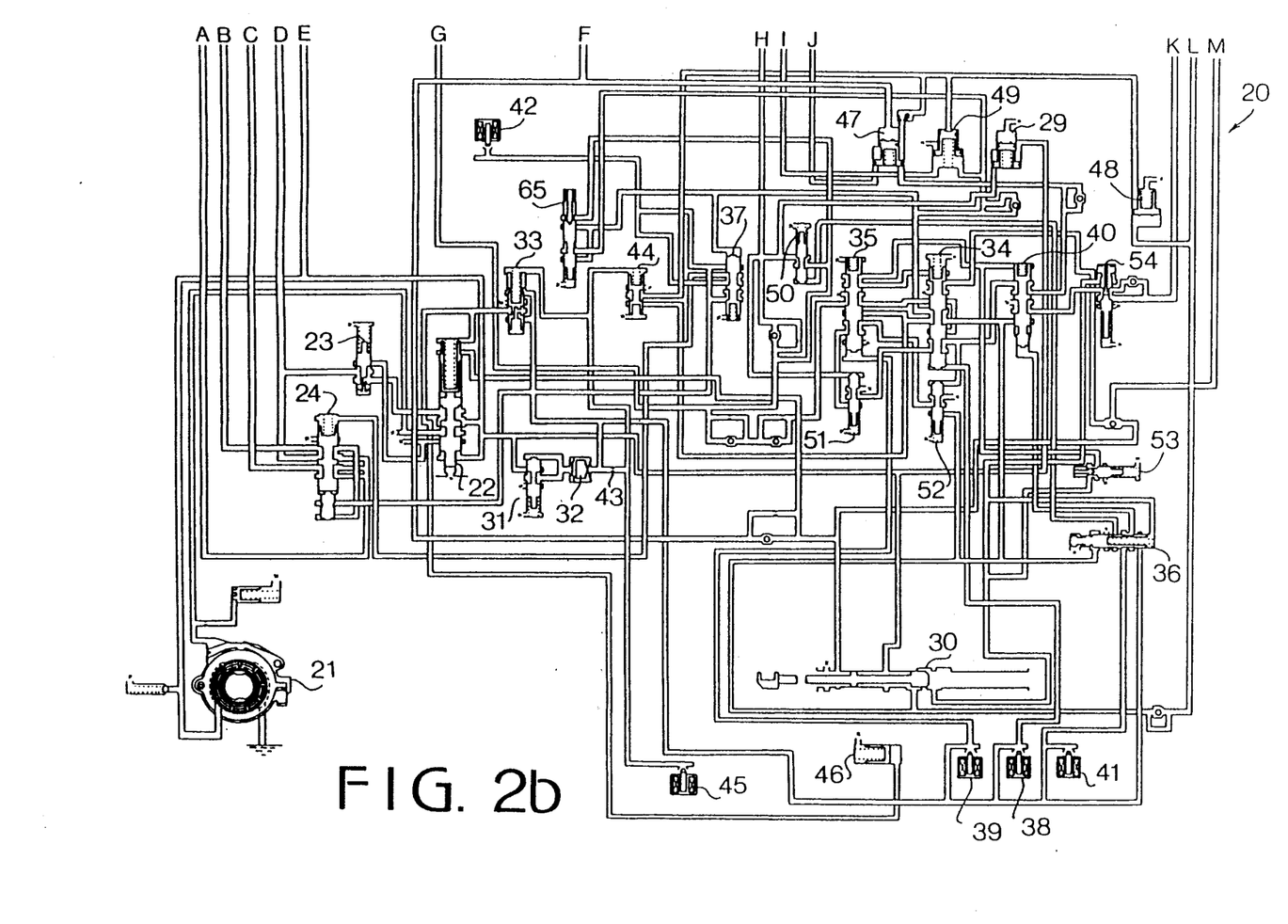

Referring to FIGS. 1 and 2, an internal combustion engine 80 is mounted on a front portion of a motor vehicle. A crankshaft 2 of the engine 80 is operatively connected to a torque converter 1 of an automatic transmission AT through a drive plate 3 of the torque converter 1. An input shaft 4 extends from a turbine of the torque converter 1 to the automatic transmission AT. The output of the automatic transmission AT is transmitted to a reduction drive shaft 7 which is aligned with the input shaft 4 through a front planetary gear 5 and a rear planetary gear 6 of the transmission AT. In order to select an operative range and to control the operative range of the transmission AT, a brake band 8, a reverse clutch 9, a high clutch 10, a forward clutch 11, an overrunning clutch 12 and a low and reverse brake 13 are provided. The reduction drive shaft 7 is connected to a front drive shaft 15 which is disposed in parallel under the automatic transmission AT through a reduction drive gear 14a mounted on the shaft 7 and a reduction driven gear 14b. The front drive shaft 15 is connected to a final reduction device 16 for front wheels of the vehicle. The reduction drive shaft 7 is connected to a rear drive shaft 18 through a transfer clutch 17, for rearwardly transmitting the torque. A band servo piston 19 is provided on the transmission for controlling the brake band 8. A hydraulic control device 20 is provided for controlling the torque converter 1, clutches 9, 12 and 17, brake 13 and band servo piston 19 of the transmission.

Referring to FIGS. 2a and 2b, the hydraulic control device 20 has an oil pump 21 connected to a pressure regulator valve 22 to produce a line pressure in a hydraulic oil circuit. The line pressure is applied to a torque converter regulator valve 23 to produce a torque converter pressure which is applied to the torque converter 1 and further to a lockup system of the torque converter 1 through a lockup control valve 24. The line pressure is applied to a transfer control valve 26 to produce a transfer clutch pressure which is applied to the transfer clutch 17. The line pressure is applied to a first pilot valve 27 to produce a pilot pressure which is converted into a duty pressure by a duty solenoid 28. The duty pressure is applied to the transfer control valve 26.

The line pressure is applied to a manual valve 30 and an accumulator 29 and is applied to a second pilot valve 31 to produce a second pilot pressure. The second pilot pressure is applied through a filter 32 to the lockup control valve 24, a pressure modifier valve 33, a shift valve 34, a first shift valve 35, a shuttle shift valve 36 and a first shuttle shift valve 37. The shift valve 34 is operated by a shift solenoid 38 and the first shift valve 35 is operated by a first shift solenoid 39. An overrunning clutch control valve 40 is operated by a shift solenoid 41 and the lockup control valve 24 is operated by a duty solenoid 42. The pilot valve 31 is communicated with a duty solenoid 45 through an orifice 43 and the pilot pressure from the pilot valve 31 is converted into a duty pressure which is applied to the pressure modifier valve 33 and an accumulator control valve 44. When the duty solenoid 45 is operated to release the duty pressure, the pressure modifier pressure from the pressure modifier valve 33 is applied to the pressure regulator valve 22 and a pressure modifier accumulator 46.

When the manual valve 30 is shifted to a reverse (R) range position, the line pressure is applied to the reverse clutch 9 and the low and reverse brake 13 to engage them and is further applied to an accumulator 47.

In a first speed of a drive range (D) or the first speed of 3-range, the shift solenoid 41 is turned on so that the overrunning clutch control valve 40 is not actuated. Thus, the line pressure is applied to the forward clutch 11 to engage it and is applied to an accumulator 48 and the accumulator control valve 44 through the shift valve 34. The accumulator control valve 44 is operated to convert the applied line pressure into an accumulator control pressure by the duty pressure from the duty solenoid 45. The accumulator control pressure is applied to accumulators 47, 48 and 49.

At that time, the line pressure applied to the reverse clutch 9 and the low and reverse brake 13 are drained and the line pressure applied to the accumulator 47 is released.

In a 2nd speed of the drive range or 2nd speed of 3-range, the shift solenoid 38 is turned off to actuate the shift valve 34. The line pressure is applied to a servo chamber 19b of the band servo piston 19 through the shift valve 34 and the accumulator 49. The line pressure is applied to the shuttle shift valve 37.

In a 3rd speed of the drive range or a 3rd speed of 3-range, the shift solenoid 39 is turned off to actuate the shift valve 35. The line pressure is applied to the high clutch 10 to engage and a servo chamber 19a of the band servo piston 19 through the shift valves 34 and 35, and further to the servo chamber 19b through the shift valve 34 and the accumulator 49 and the accumulator 29 through a 3-2 timing valve 50 to control a servo charge valve 65 and a 4-2 sequence valve 51.

In a 4th speed of the drive range, the shift solenoid 38 is turned on to control the shift valve 34. The line pressure is applied to servo chambers 19a and 19b through the shift valves 34 and 35 and through the shift valve 34 and the accumulator 49, respectively, and is further applied to a servo chamber 19c through the shift valve 34, the overrunning clutch control valve 40 and the accumulator 47, and to a 4-2 relay valve 52.

In the drive range or 3-range operation, when the accelerator pedal is depressed to turn on the duty solenoid 42, the pilot pressure applied to the lockup control valve 24 through the shuttle shift valve 37 is drained and the pressure applied to the lockup system of the torque converter 1 is also drained. The line pressure is increased to control the shuttle shift valve 36 and the 3-2. timing valve 50.

In a first speed of a 2-range or a first speed of a low gear hold range, the shift solenoids 38 and 39 are turned on and the shift solenoid 41 is turned off. The line pressure is applied to the shuttle shift valve 36 and a first reducing valve 53. A first reducing pressure is applied from the first reducing valve 53 to the low and reverse brake 13 through shift valves 34 and 35. The overrunning clutch control valve 40 is controlled to supply the line pressure to an overrunning clutch reducing valve 54 to produce an overrunning clutch pressure which is applied to the overrunning clutch 12. The line pressure in the high clutch 10 and band servo piston 19 is released and the pressure in accumulators 29, 47 and 49 is also released. Thus, the line pressure is not applied to the band servo piston 19.

For controlling the lockup system in a 2-range-2nd-speed or a low-gear-hold-2nd-speed, the shift solenoid 38 is turned off. Thus, the pilot pressure applied to the shift valve 34 is released, and the line pressure is applied to the servo chamber 19b in the same manner as the operation in the drive-range-2nd-speed or the 3-range-2nd-speed.

For controlling the lockup system in a 2-range-3rd-speed or a low-gear-hold-3rd-speed, the shift solenoids 38 and 39 are turned off. The pilot pressure applied to shift the valves 34 and 35 are released. Thus, the line pressure is applied to the servo chambers 19a and 19b through the accumulators 29 and 49 in the same manner as the operation in the drive-range-3rd-speed or 3-range-3rd-speed.

Referring to FIG. 1, a control unit 55 is provided to produce output signals for actuating the duty solenoids 42 and 45 and shift solenoids 38, 39 and 41 of the hydraulic control device 20 in accordance with the operation of the manual valve 30. The control unit 55 is adapted to electronically control the transmission in accordance with transmission characteristics shown in the graph of FIGS. 5a and 5b. The control unit 55 is applied with signals from sensors such as a vehicle speed sensor 57, a throttle position sensor 58 and an alcohol concentration sensor 64. In the system, fuel is supplied from a fuel tank 61 to a fuel injector 63 of the engine 80 through a fuel pump 62. The alcohol concentration sensor 64 is provided for sensing the concentration of alcohol in the fuel passing a pressure regulator 62a for regulating a fuel pressure. The control unit 55 calculates these signals and produces control signals which are applied to drivers of the solenoids.

Figure 3:
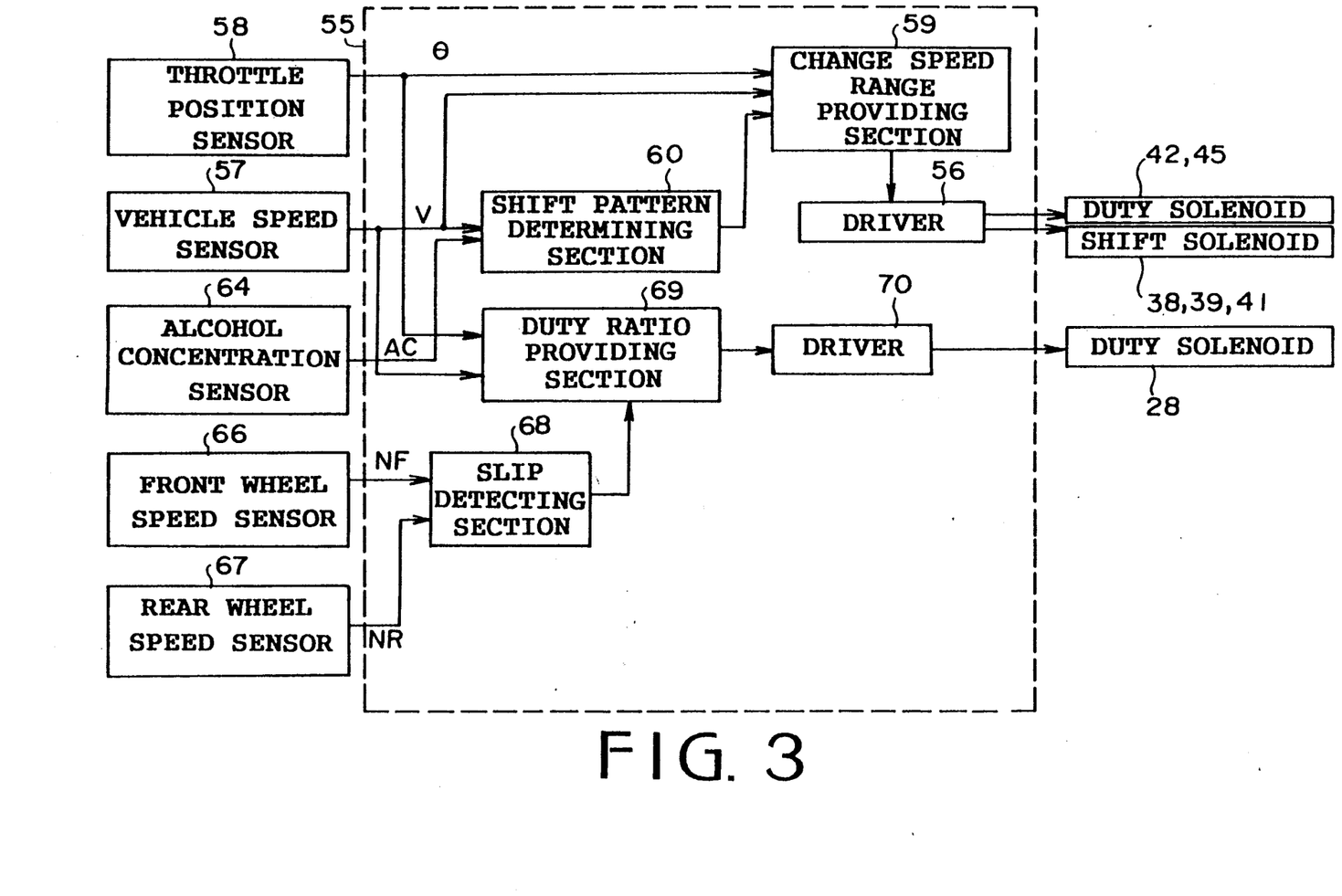
FIG. 3 is a block diagram showing a control unit of the system.
Figure 5A:
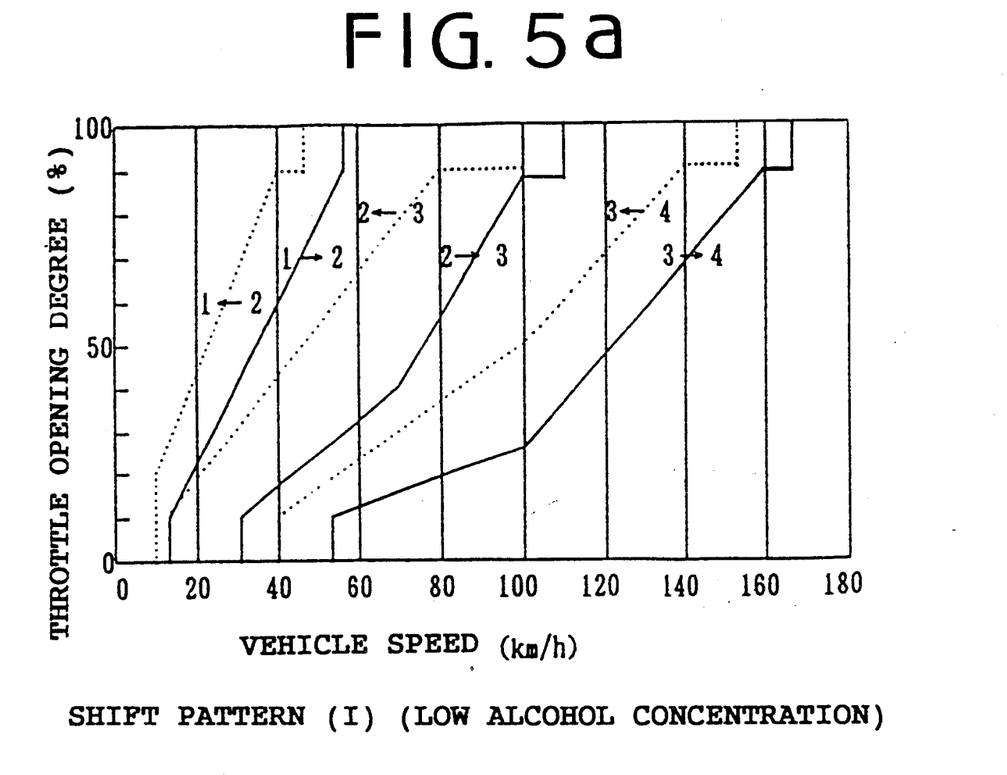
FIG. 5a and 5b are graphs showing characteristics of transmission control.
Figure 5B:
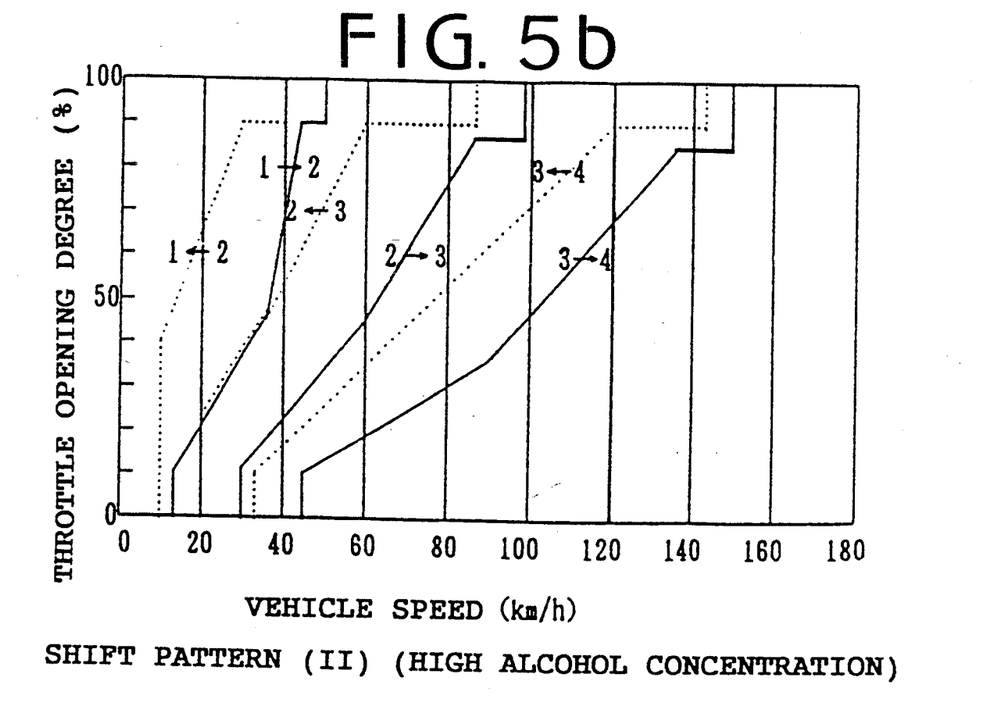

Referring to FIG. 3 showing the control unit 55, the control unit is provided with a shift pattern determining section 60 which is applied with a vehicle speed signal V from the vehicle speed sensor 57 and an alcohol concentration AC from the alcohol concentration sensor 64. The section 60 selects an optimum shift pattern in accordance with the alcohol concentration from the characteristics shown in FIGS. 5a and 5b and produces a selected shift pattern signal. When the detected alcohol concentration AC is lower than a set value AS (for example 50% or less), a change speed shift pattern (I) shown in FIG. 5a is selected. When the detected alcohol concentration AC is higher than the set value AS, a change speed shift pattern (II) shown in FIG. 5b is selected. The selected shift pattern signal is applied to a change speed range providing section 59 to which a throttle opening degree signal $\theta$ from the throttle position sensor 58, and the vehicle speed signal V are applied. The change speed range providing section 59 determines an optimum change speed range in accordance with the input shift pattern signal. The range providing section 59 produces a change speed range signal representing one of change speed ranges such as drive range, 2nd range, 3-range, or reverse range. The change speed range signal is applied to a driver 56 for driving the duty solenoids 42 and 45 and the shift solenoids 38, 39 and 41 of the hydraulic control device 20.

The control unit 55 is further provided with a front wheel speed sensor 66 for detecting front wheel speed NF through a meter cable (not shown) and a rear wheel speed sensor 67 for detecting rear wheel speed NR through the rear drive shaft 18. The front wheel speed signal NF and the rear wheel speed signal NR are applied to a slip detecting section 68 in which a slip ratio e of the front wheel speed NF to the rear wheel speed NR is calculated in accordance with the equation expressed as e=NR/NF. The ratio e is applied to a duty ratio providing section 69 to which the throttle opening degree $\theta$ and the vehicle speed V are applied. In the section 69, a duty ratio table of the transfer clutch 17 is provided at every driving range for controlling the clutch torque. The section 69 operates to derive a duty ratio from the table in accordance with the throttle opening degree 8 and the vehicle speed V for providing an optimum duty ratio. When the wheels slip, the duty ratio is corrected corresponding to the slip ratio e. A duty ratio signal is applied to the duty solenoid 28 through a driver 70 for controlling the transfer control valve 26.

Figure 4:
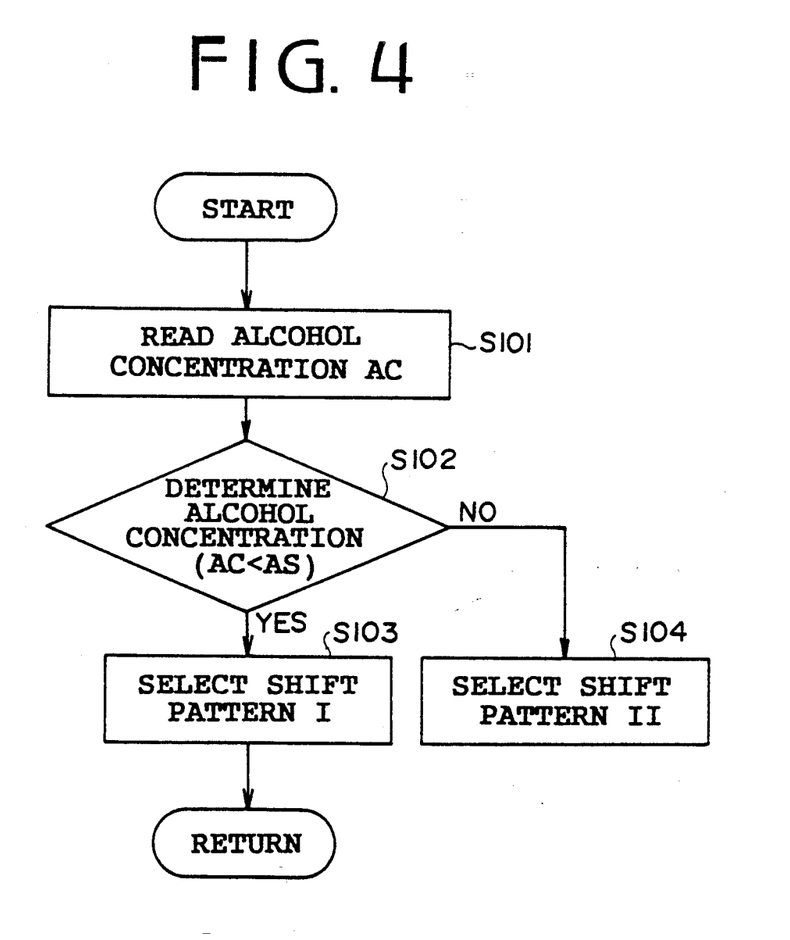
FIG. 4 is a flowchart showing an operation of the system.

The operation for selecting the shift pattern in the shift pattern determining section 60 will be described with reference to FIG. 4.

At a step S101, the alcohol concentration AC detected by the alcohol concentration sensor 64 is read. At a step S102, the alcohol concentration AC is compared with the set value AS and it is determined whether the concentration AC is lower than the set value AS or not (AC<AS).

When AC<AS, the change speed shift pattern (I) shown in FIG. 5a is selected at a step S103 and the transmission is controlled in accordance with the pattern (I). When AC>AS, the change speed shift pattern (II) shown in FIG. 5b is selected at a step S104 for controlling the transmission in accordance with the pattern (II).

In accordance with the present invention, in the change speed shift pattern for high alcohol concentration, the vehicle speed for upshifting the transmission is determined lower than that in the change speed shift pattern for low alcohol concentration. When the shift pattern for high alcohol is selected, the engine speed is kept at a low speed so that the engine is quiet, thereby improving fuel consumption.

The driver can stably drive the vehicle without feeling the change of the engine performance caused by the difference of the alcohol concentration.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In an automatic transmission system for a motor vehicle having an alcohol engine using a fuel mixed with alcohol and gasoline, a fuel tank and a fuel pump for supplying the fuel from the fuel tank to the engine through a fuel passage, the system having an automatic transmission operative in a plurality of change speed ranges, a vehicle speed sensor detecting speed of the motor vehicle and for producing a vehicle speed signal, a throttle position sensor for detecting opening degree of a throttle valve of the engine and for producing a throttle opening degree signal, range providing means responsive to the vehicle speed signal and the throttle opening degree signal for producing a change speed range signal representing a respective one of the plurality of change speed ranges in accordance with a current change shift pattern, and actuating means responsive to the change speed range signal for providing said one change speed range for the automatic transmission, the improvement in the system which comprises:

an alcohol concentration sensor provided on the fuel passage between the fuel pump and the engine for sensing concentration of the alcohol in th fuel and for producing an alcohol concentration signal; and change speed shift pattern determining means providing a plurality of change shift patterns dependent on alcohol concentration of the alcohol in the fuel and responsive to said alcohol concentration signal for selecting one of said plurality of change shift patterns for determining the current change shift pattern so as to improve driveability of the vehicle.

2. The system according to claim 1, wherein
    the change speed shift pattern determining means is further responsive to an acceleration of the throttle opening degree for determining the shift pattern.

3. The system according to claim 1, wherein:
    said change speed shift pattern determining means includes comparator means responsive to said alcohol concentration signal for comparing the concentration of the alcohol sensed by said alcohol concentration sensor with a predetermined value and producing a comparison signal; and
    said change speed shift pattern determining means is further responsive to said comparison signal for determining the current change shift pattern.

4. The system according to claim 1, wherein
    said change speed shift pattern determining means selects a high alcohol change shift pattern when the sensed alcohol concentration is higher than a predetermined value;
    said high alcohol change shift pattern has a transmission ratio changing vehicle speed value for changing a change speed range in said high alcohol change shift pattern; and
    said transmission ratio changing vehicle speed value of said high alcohol change shift pattern is lower than corresponding transmission ratio changing vehicle speed values in the other of said plurality of the change shift patterns, thereby preventing a driver of the vehicle from feeling change of the engine performance caused by difference of the alcohol concentration and improving fuel consumption.

5. The system according to claim 4, wherein
    said transmission ratio changing vehicle speed value for changing the change speed range in said high alcohol change shift pattern is for upshifting the transmission.

* * * * *